United States Patent
Park et al.

(10) Patent No.: US 10,719,158 B2
(45) Date of Patent: Jul. 21, 2020

(54) DISPLAY APPARATUS

(71) Applicant: Samsung Display Co., Ltd., Yongin-si (KR)

(72) Inventors: Sungkook Park, Suwon-si (KR); Taehee Lee, Hwaseong-si (KR); Won-ki Hong, Suwon-si (KR); Moonhee Seo, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/417,450

(22) Filed: May 20, 2019

(65) Prior Publication Data

US 2019/0391692 A1    Dec. 26, 2019

(30) Foreign Application Priority Data

Jun. 26, 2018 (KR) ........................ 10-2018-0073163

(51) Int. Cl.
| | |
|---|---|
| *G06F 3/041* | (2006.01) |
| *G06F 3/044* | (2006.01) |
| *G01L 1/18* | (2006.01) |
| *G06F 1/16* | (2006.01) |

(52) U.S. Cl.
CPC .............. *G06F 3/0412* (2013.01); *G01L 1/18* (2013.01); *G06F 1/1637* (2013.01); *G06F 3/0446* (2019.05); *G06F 2203/04105* (2013.01)

(58) Field of Classification Search
CPC .... G06F 3/0412; G06F 3/0446; G06F 1/1637; G06F 2203/04105; G06F 2203/04111; G06F 3/0443; G01L 1/18
See application file for complete search history.

(56) References Cited

U.S. PATENT DOCUMENTS

| | | |
|---|---|---|
| 7,511,702 B2 | 3/2009 | Hotelling |
| 7,538,760 B2 | 5/2009 | Hotelling et al. |
| 8,654,524 B2 | 2/2014 | Pance et al. |
| 8,686,952 B2 | 4/2014 | Burrough et al. |
| 8,787,006 B2 | 7/2014 | Golko et al. |
| 9,178,509 B2 | 11/2015 | Bernstein |
| 9,195,343 B1 | 11/2015 | Zarraga et al. |
| 9,274,660 B2 | 3/2016 | Bernstein et al. |
| 9,513,663 B2 | 12/2016 | Jones et al. |

(Continued)

FOREIGN PATENT DOCUMENTS

| | | |
|---|---|---|
| KR | 10-1594174 | 2/2016 |
| KR | 10-2017-0074615 | 6/2017 |

*Primary Examiner* — Abhishek Sarma
(74) *Attorney, Agent, or Firm* — H.C. Park & Associates, PLC

(57) ABSTRACT

A display apparatus includes a display panel and a touch sensing unit disposed on the display panel. The touch sensing unit includes a touch sensor and a first pressure sensor. The touch sensor includes a first touch electrode layer and a second touch electrode layer disposed on the first touch electrode layer. The first pressure sensor includes: a transmission pressure electrode, a sensing pressure electrode separated from the transmission pressure electrode, and a piezoresistive pattern contacting each of the transmission pressure electrode and the sensing pressure electrode. Each of the transmission pressure electrode and the sensing pressure electrode is disposed in a same layer as any one of the first touch electrode layer and the second touch electrode layer.

20 Claims, 15 Drawing Sheets

(56) References Cited

U.S. PATENT DOCUMENTS

| | | |
|---|---|---|
| 9,886,116 B2 | 2/2018 | Parivar et al. |
| 2013/0082970 A1* | 4/2013 | Frey ..................... G06F 3/0414 |
| | | 345/173 |
| 2014/0085213 A1 | 3/2014 | Huppi et al. |
| 2014/0090488 A1* | 4/2014 | Taylor ..................... G01L 1/18 |
| | | 73/862.625 |
| 2015/0059486 A1* | 3/2015 | Choong ................ G01L 9/0052 |
| | | 73/727 |
| 2019/0087046 A1* | 3/2019 | Guo ........................ G06F 3/044 |

* cited by examiner

DISPLAY APPARATUS

CROSS-REFERENCE TO RELATED APPLICATION

This application claims priority from and the benefit of Korean Patent Application No. 10-2018-0073163, filed Jun. 26, 2018, which is hereby incorporated by reference for all purposes as if fully set forth herein.

BACKGROUND

Field

Exemplary embodiments generally relate to a display apparatus, and, more particularly, to a display apparatus capable of sensing pressure as an external input.

Discussion

A display apparatus displays various images on a display screen to provide information to a user. In addition, the display apparatus may sense an external input, for example, a touch and/or pressure, by a user. Further, to meet a consumer demand, the bezel, which is a non-display area of a display apparatus, is being gradually contracted. Since a sensor configured to sense pressure as an external input may be attached inside the display apparatus as a separate module, manufacturing cost may increase. Also, there is demand for a pressure sensor disposed so as not to be visually recognized by a user, but ensures sufficient sensitivity.

The above information disclosed in this section is only for understanding the background of the inventive concepts, and, therefore, may contain information that does not form prior art.

SUMMARY

Some exemplary embodiments are capable of providing a display apparatus in which pressure as an external input is sensed on a non-display area in which an image is not displayed, and may have an effect that a physical button is provided in the non-display area.

Some exemplary embodiments are capable of providing a display apparatus in which a pressure sensor is formed by employing a process for forming a touch sensor to minimize (or reduce) a process for forming the pressure sensor and to save costs and/or time.

Additional aspects will be set forth in the detailed description which follows, and, in part, will be apparent from the disclosure, or may be learned by practice of the inventive concepts.

According to some exemplary embodiments, a display apparatus includes a display panel and a touch sensing unit disposed on the display panel. The touch sensing unit includes a touch sensor and a first pressure sensor. The touch sensor includes a first touch electrode layer and a second touch electrode layer disposed on the first touch electrode layer. The first pressure sensor includes a transmission pressure electrode, a sensing pressure electrode separated from the transmission pressure electrode, and a piezoresistive pattern contacting each of the transmission pressure electrode and the sensing pressure electrode. Each of the transmission pressure electrode and the sensing pressure electrode is disposed in a same layer as any one of the first touch electrode layer and the second touch electrode layer.

According to some exemplary embodiments, a display apparatus includes a display panel, a touch sensing unit, and a window member. The display panel includes a base layer, a circuit element layer disposed on the base layer, a display element layer disposed on the circuit element layer, an encapsulation layer encapsulating the display element layer, and a pressure sensor. The touch sensing unit is disposed on the display panel. The window member is disposed on the touch sensing unit. The pressure sensor includes a transmission pressure electrode, a sensing pressure electrode spaced apart from the transmission pressure electrode, and a piezoresistive pattern contacting each of the transmission pressure electrode and the sensing pressure electrode. The pressure sensor is disposed between the base layer and the window member.

According to some exemplary embodiments, a display apparatus includes a display panel and a touch sensing unit. The display panel includes a display area configured to display an image and a non-display area outside the display area. The touch sensing unit is disposed on the display panel. The touch sensing unit includes a touch sensor overlapping the display area on a plane and a pressure sensor overlapping the non-display area on the plane. The touch sensor includes a first touch electrode layer and a second touch electrode layer disposed on the first touch electrode layer. The pressure sensor includes a transmission pressure electrode, a sensing pressure electrode spaced apart from the transmission pressure electrode, and a piezoresistive pattern contacting each of the transmission pressure electrode and the sensing pressure electrode.

The foregoing general description and the following detailed description are exemplary and explanatory and are intended to provide further explanation of the claimed subject matter.

BRIEF DESCRIPTION OF THE FIGURES

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts. In the drawings.

DETAILED DESCRIPTION OF THE ILLUSTRATED EMBODIMENTS

Figure 1:
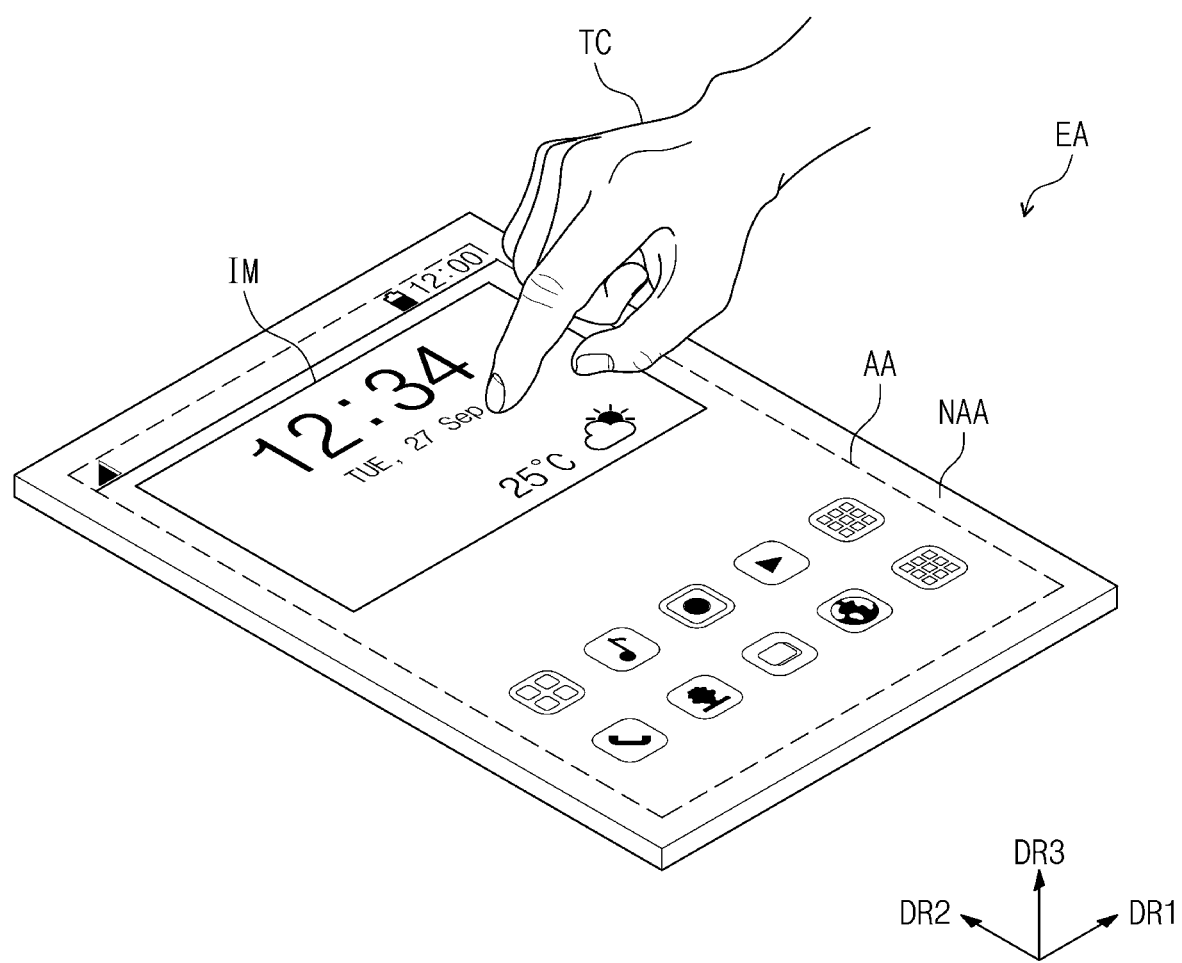
FIG. 1 is a perspective view of a display apparatus according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the D1-axis, the D2-axis, and the D3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to cross-sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be explained in detail with reference to the accompanying drawings.

FIG. 1 is a perspective view of a display apparatus according to some exemplary embodiments.

With reference to FIG. 1, the display apparatus EA may be a touch screen device. The touch screen device may be at least one of, for example, a smart phone, a tablet personal computer, a mobile phone, an e-book reader, a notebook computer, a personal digital assistant (PDA), a portable multimedia player (PMP), an MP3 player, a mobile medical device, a camera, a wearable display apparatus, and/or the like.

An activation area AA and a pressure area NAA may be defined in the display apparatus EA. The pressure area NAA may be defined on the outskirts of the activation area AA. As seen in FIG. 1, the pressure area NAA is exemplarily illustrated to surround the activation area AA.

The display apparatus EA may recognize touch coordinates as an external input TC on the activation area AA. In some exemplary embodiments, the display apparatus EA may recognize the magnitude and a location of the pressure as the external input TC on the pressure area NAA.

A display area (not shown) and a non-display area (not shown) adjacent to the display area may be defined on the display apparatus EA. The display apparatus EA may display an image IM on (or in) the display area and may not display the image on the non-display area. The display area may be substantially similar to the activation area AA. However, due to a structural difference between the display panel DP and the touch sensing unit TS, the display area may be larger or smaller than the activation area AA on a plane, e.g., a plane parallel to a plane defined by the first direction DR1 and the second direction DR2.

In some exemplary embodiments, as the external input (or pressure) TC, a user hand is exemplarily illustrated, but is not limited thereto. For instance, the external input TC may be a stylus pen input or a hovering input according to a sensing element included in (or otherwise part of) the display apparatus EA.

The appearance of the display apparatus EA may have various shapes, but the display apparatus EA in some exemplary embodiments may have a short side extended in a first direction DR1 and a long side extended in a second direction DR2. The thickness direction of the display apparatus EA may be defined in a third direction DR3.

Figure 2:
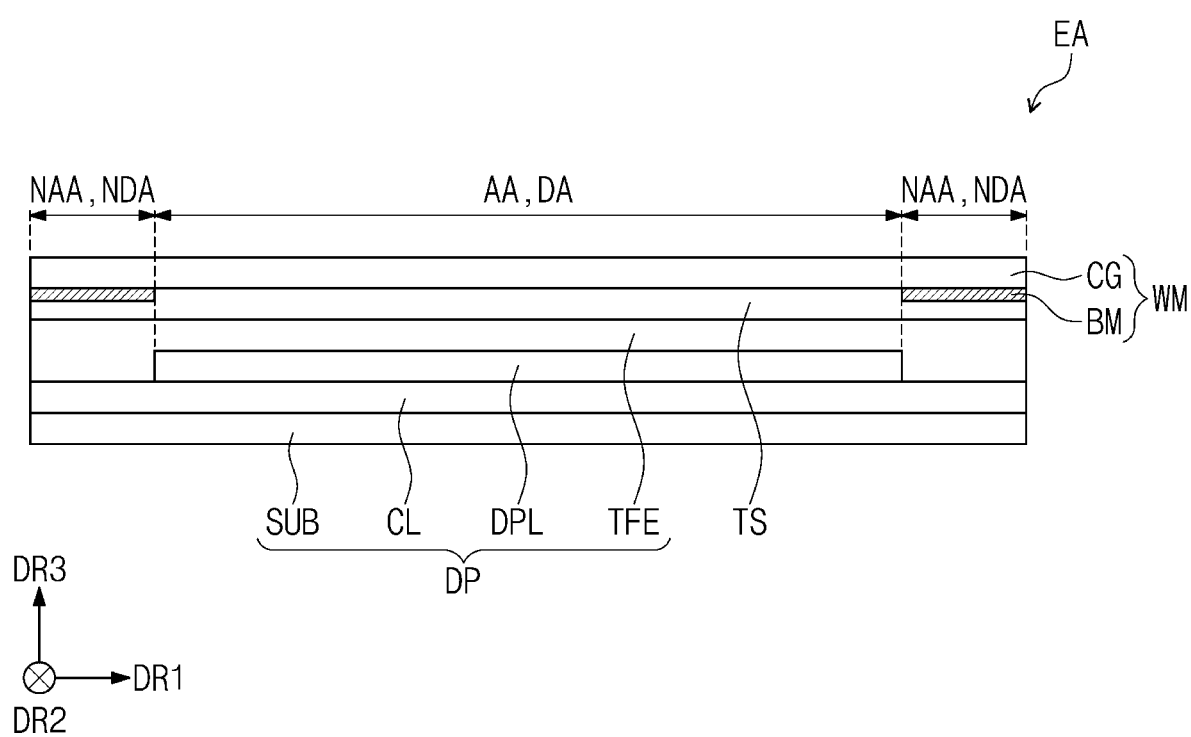
FIG. 2 is a cross-sectional view of a display apparatus according to some exemplary embodiments.

FIG. 2 is a cross-sectional view of a display apparatus according to some exemplary embodiments. For instance, FIG. 2 illustrates a cross-section defined by the first direction DR1 and the third direction DR3.

As illustrated in FIG. 2, the display apparatus EA includes a display panel DP, a touch sensing unit (or touch sensing layer) TS, and a window member WM. Although not illustrated separately, the display apparatus EA according to some exemplary embodiments may further include a protection member disposed on, for example, the bottom surface of the display apparatus EA.

The display panel DP may be a light emitting type display panel, but is not particularly limited thereto. For example, the display panel DP may be an organic light emitting display panel, a quantum dot light emitting display panel, etc. A light emitting layer of the organic light emitting display panel includes, for instance, an organic light emitting material. A light emitting layer of the quantum dot light emitting display panel includes, for example, quantum dots and/or quantum rods. Hereinafter, the display panel DP will be described as the organic light emitting display panel.

The display panel DP includes a base layer SUB, a circuit element layer CL disposed on the base layer SUB, a display element layer DPL, and an encapsulation layer TFE. Although not illustrated separately, the display panel DP may further include at least one functional layer, such as a refractive index adjustment layer.

The base layer SUB may include at least one plastic film. The base layer SUB may include, as a flexible substrate, a plastic substrate, a glass substrate, a metal substrate, or an organic/inorganic composite material substrate, etc.

The circuit element layer CL includes at least one intermediate insulation layer and a circuit element. The intermediate insulation layer includes at least one intermediate inorganic film and at least one intermediate organic film. The circuit element includes signal lines and a driving circuit of a pixel, etc.

The display element layer DPL includes at least one organic light emitting diode. The display element layer DPL may further include an organic film, such as a pixel define layer.

The encapsulation layer TFE encapsulates the display element layer DPL. The encapsulation layer TFE includes at least one inorganic film (hereinafter, encapsulation inorganic film). The encapsulation layer TFE may further include at least one organic film (hereinafter, encapsulation organic film). The encapsulation inorganic film may protect the display element layer DPL from moisture, oxygen, etc. (hereinafter, moisture/oxygen) and the encapsulation organic film may protect the display element layer DPL from a foreign material, such as a dust particle. The encapsulation inorganic film may include a silicon nitride layer, a silicon oxynitride layer, and a silicon oxide layer, a titanium oxide layer, or an aluminum oxide layer, etc. The encapsulation organic film may include an acrylic-based inorganic layer, but is not limited thereto.

The touch sensing unit TS may acquire, detect, or otherwise determine coordinate information on (or for) a touch interaction by means of, for instance, an external input (e.g., external input TC), coordinate information on pressure, and pressure intensity. The touch sensing unit TS may be disposed on the encapsulation layer TFE. The touch sensing unit TS may be directly disposed on the encapsulation layer TFE. For the purposes of this disclosure, "directly disposed" or "disposed directly" precludes attaching using a separate adhesion layer, and means forming through consecutive processes, e.g., consecutive manufacturing processes. However, exemplary embodiments are not limited thereto, and the touch sensing unit TS may be attached onto the encapsulation layer TFE using an attachment layer.

The touch sensing unit TS may have a multi-layer structure. The touch sensing unit TS may include a conductive layer of a single layer or multiple layers. The touch sensing unit TS may include an insulation layer of a single layer or multiple layers.

The touch sensing unit TS may sense the touch coordinates of an external input (e.g., external input TC) in a capacitive manner in the activation area AA. In some exemplary embodiments, an operation manner in which the touch sensing unit TS senses the touch coordinates in the activation area AA is not particularly limited, and the touch coordinates of an external input TC may be sensed in an electromagnetic induction manner, a pressure sensing manner, or other suitable manner.

The touch sensing unit TS may sense the magnitude and a location of applied pressure in the pressure area NAA. A more detailed description of the sensation of the magnitude and the location will be provided later.

The window member WM may include a cover window CG and a shield layer BM.

The cover window CG may include a substantially transparent material. The cover window CG may be a glass substrate or a plastic substrate.

The shield layer BM may be disposed under the cover window CG. The shield layer BM may block or reflect incident light. The shield layer BM may be a reference for defining the display area DA and the non-display area NDA. The shield layer BM may not overlap the display area DA and may overlap the non-display area NDA.

As seen in FIG. 2, it is exemplarily illustrated for convenience that the display area DA and the activation area AA are identical, and the non-display area NDA and the pressure area NAA are identical. However, as described above, exemplary embodiments are not limited thereto. The display area DA and the activation area AA may not always be identical, and the non-display area NDA and the pressure area NAA may not always be identical.

Figure 3:
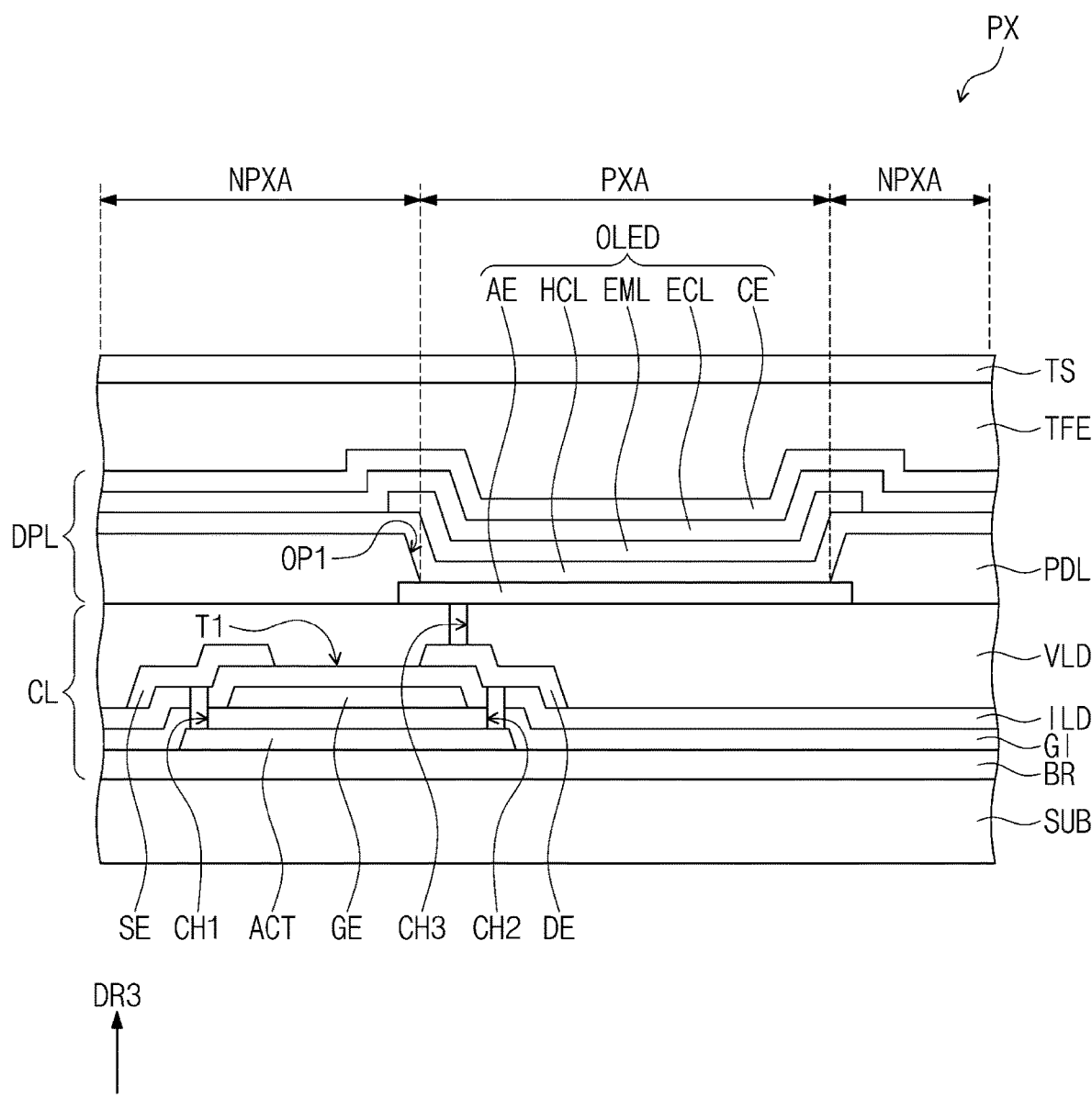
FIG. 3 is a partial cross-sectional view of a display panel according to some exemplary embodiments.

FIG. 3 is a partial cross-sectional view of a display panel according to some exemplary embodiments. For instance, FIG. 3 illustrates one light emitting area and an area adjacent to the one light emitting area.

The circuit element layer CL may include signal lines and a transistor. In relation to FIG. 3, the first transistor T1 will be exemplarily described.

The circuit element layer CL may include a barrier layer BR, an active layer ACT, a gate insulation layer GI, a gate electrode GE, a interlayer insulation film ILD, input and output electrodes SE and DE, and an intermediate insulation film VLD.

The barrier layer BR is disposed on the base layer SUB, and prevents (or at least reduces) a foreign material from flowing onto (or into) the barrier layer BR.

Although not shown, the display panel DP may further include a buffer film (or layer) disposed above the barrier layer BR. The buffer film may improve bonding strength between the base layer SUB and layers disposed above the base layer SUB. The barrier layer BR and the buffer film may be selectively disposed or omitted.

The active layer ACT is disposed on the barrier layer BR. The active layer ACT may function as a channel area of a first transistor T1. The active layer ACT may be at least one selected from the group consisting of amorphous silicon, poly-silicon, and metal-oxide-semiconductor.

The gate insulation layer GI may be disposed on the active layer ACT. The gate insulation layer GI may insulate the gate electrode GE from the active layer ACT.

The gate electrode GE may be disposed on the gate insulation layer GI. The gate electrode GE may be disposed to overlap the active layer ACT.

The interlayer insulation film ILD may be disposed on the gate electrode GE. The interlayer insulation film ILD may electrically insulate the gate electrode GE from the input and output electrodes SE and DE. The interlayer insulation film ILD may include an inorganic material. The inorganic material may include at least one of silicon nitride, silicon oxynitride, and silicon oxide, etc.

The input and output electrodes SE and DE may be disposed on the interlayer insulation film ILD. The input and output electrodes SE and DE may be electrically connected to the active layer ACT through first and second contact holes CH1 and CH2 provided respectively to (or in) the interlayer insulation film ILD and the gate insulation layer GI.

A second conductive layer (not shown) forming signal lines may be disposed on (or in) the same layer as the input and output electrodes SE and DE.

As seen in FIG. 3, the display panel DP is exemplarily illustrated to have a top-gate structure in which the gate electrode GE is disposed above the active layer ACT, but in some exemplary embodiments, the display panel DP may have a bottom-gate structure in which the gate electrode GE is disposed under the active layer ACT or a dual-gate structure in which gate electrodes GE are disposed above and below the active layer ACT.

The intermediate insulation film VLD may be provided on the input and output electrodes SE and DE. The intermediate insulation film VLD may provide a planar surface, e.g., may function as a planarization layer. The intermediate insulation film VLD may include an organic material. The organic material may include at least one of an acrylic resin, a methacrylic resin, polyisoprene, a vinyl resin, an epoxy resin, a polyurethane resin, a cellulose-based resin, a siloxane-based resin, a polyimide resin, a polyamide-based resin, and a perylene-based resin.

The display element layer DPL is disposed on the intermediate insulation film VLD. The display element layer DPL may include a pixel define layer PDL and a display element. In some exemplary embodiments, the display element may be an organic light emitting diode OLED. The organic light emitting diode OLED includes a first electrode AE, a hole control layer HCL, a light emitting layer EML, an electron control layer ECL, and a second electrode CE.

The pixel define layer PDL may include an organic material. The first electrode AE is disposed on the intermediate insulation film VLD. The first electrode AE may be connected to the output electrode DE through a third contact hole CH3 penetrating the intermediate insulation film VLD. A first opening part OP1 is defined in the pixel define layer PDL. The first opening part OP1 of the pixel define layer PDL exposes at least a part of the first electrode AE.

The pixel PX may be disposed on a pixel area on a plane. The pixel area may include the light emitting area PXA and a non-light emitting area NPXA adjacent to the light emitting area PXA. The non-light emitting area NPXA may surround the light emitting area PXA. As seen in FIG. 3, the light emitting area PXA is defined to correspond to a part of an area of the first electrode AE exposed by the first opening part OP1.

The hole control layer HCL may be commonly disposed in the light emitting area PXA and the non-light emitting area NPXA. Although not shown separately, a common layer, such as the hole control layer HCL, may be commonly formed in association with a plurality of pixels PX of the display apparatus EA.

The light emitting layer EML is disposed on the hole control layer HCL. The light emitting layer EML may be disposed in an area corresponding to the first opening part OP1. In other words, the light emitting layer EML may be separately formed in each of the plurality of pixels PX. The light emitting layer EML may include an organic material and/or an inorganic material. As seen in FIG. 3, a patterned light emitting layer EML is exemplarily illustrated, but the light emitting layer EML may be commonly disposed in the plurality of pixels PX of the display apparatus EA. Here, the light emitting layer EML may generate any one of red, green, blue, and white light beams; however, exemplary embodiments are not limited thereto. In addition, the light emitting layer EML may have a multi-layer structure.

The electron control layer ECL is disposed on the light emitting layer EML. Although not shown separately, the electron control layer ECL may be commonly formed in association with the plurality of pixels PX of the display apparatus EA.

The second electrode CE is disposed on the electron control layer ECL. The second electrode CE is commonly disposed in association with the plurality of pixels PX of the display apparatus EA.

The encapsulation layer TFE is disposed on the second electrode CE. The encapsulation layer TFE is commonly disposed in association with the plurality of the pixels PX of the display apparatus EA. As seen in FIG. 3, the encapsulation layer TFE directly covers the second electrode CE. In some exemplary embodiments, a capping layer may be further disposed to cover the second electrode CE. Here, the encapsulation layer TFE may directly cover the capping layer.

The encapsulation layer TFE includes at least one inorganic film (hereinafter, encapsulation inorganic film). The encapsulation layer TFE may further include at least one organic film (hereinafter, encapsulation organic film). The encapsulation inorganic film protects the display element layer DPL from moisture/oxygen, and the encapsulation organic film protects the display element layer DPL from a foreign material, such as a dust particle. The encapsulation inorganic film may include at least one of a silicon nitride layer, a silicon oxynitride layer, and a silicon oxide layer, a titanium oxide layer, and an aluminum oxide layer, etc. The encapsulation organic film may include an acrylic-based inorganic layer, but is not limited thereto.

The touch sensing unit TS is disposed on the encapsulation layer TFE.

Figure 4:
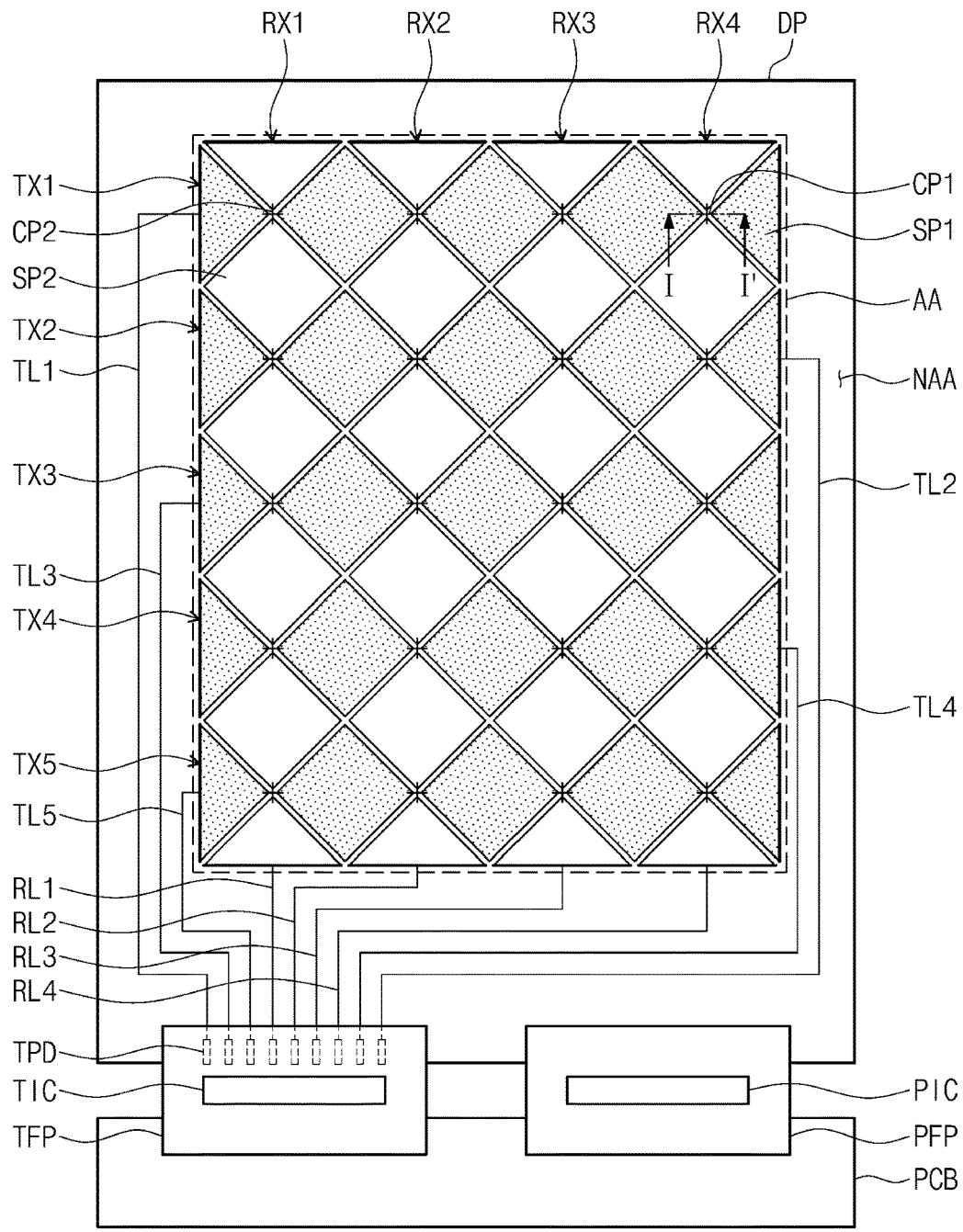
FIG. 4 is a plan view illustrating a touch sensor, a touch circuit board, and a pressure circuit board of a touch sensing unit of the display apparatus in FIG. 2 according to some exemplary embodiments.
Figure 5:
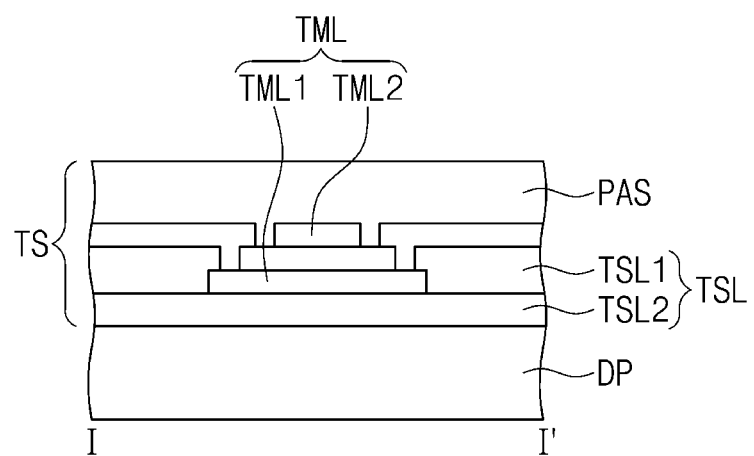
FIG. 5 is a cross-sectional view along sectional line I-I' of FIG. 4 according to some exemplary embodiments.
Figure 5:
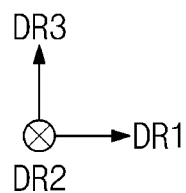

FIG. 4 is a plan view illustrating a touch sensor, a touch circuit board, and a pressure circuit board of a touch sensing unit of the display apparatus in FIG. 2 according to some exemplary embodiments. FIG. 5 is a cross-sectional view along sectional line I-I' of FIG. 4 according to some exemplary embodiments.

The touch sensing unit TS may include a touch electrode layer TML and a touch insulation layer TSL. The touch insulation layer TSL may contact the touch electrode layer TML.

The touch electrode layer TML may include a first touch electrode layer TML1 and a second touch electrode layer TML2. The touch insulation layer TSL may include a first touch insulation layer TSL1 and a second touch insulation layer TSL2.

The second touch electrode layer TML2 may be disposed over the first touch electrode layer TML1.

Each of the first touch electrode layer TML1 and the second touch electrode layer TML2 may have a single layer structure or a laminated multilayer structure. A conductive layer of the multilayer structure may include at least two of transparent conductive layers and metal layers. The conductive layer of the multilayer structure may include metal layers including different metals. The transparent conductive layer may include at least one of indium tin oxide (ITO), indium zinc oxide (IZO), zinc oxide (ZnO), indium tin zinc oxide (ITZO), poly(3,4-ethylenedioxythiophene (PEDOT), a metal nanowire, or graphene. The metal layer may include at least one of molybdenum, silver, titanium, copper, aluminum, or an alloy thereof. For example, each of the first touch electrode layer TML1 and the second touch layer TML2 may have a three-layer structure of titanium/aluminum/titanium.

The first touch insulation layer TSL1 may be disposed between the first touch electrode layer TML1 and the second touch electrode TML2. The second touch insulation layer TSL2 may be disposed between the uppermost layer of the display panel DP (e.g., the encapsulation layer TFE) and the first touch electrode layer TML1. However, exemplary embodiments are not limited thereto, and the second touch insulation layer TSL2 may be selectively omitted.

The first touch insulation layer TSL1 and the second touch insulation layer TSL2 may include inorganic materials. The inorganic material may include at least one of silicon nitride, silicon oxynitride, and silicon oxide, etc.

The touch sensing unit TS may further include a planarization film PAS disposed above the second touch electrode layer TML2. The planarization layer PAS may provide a planar surface and include an inorganic material.

The touch sensing unit TS may include a touch sensor and a pressure sensor. The touch sensor will be described in more detail with reference to FIGS. 4 and 5.

As shown in FIG. 4, the touch sensor may be disposed in the activation area AA.

The touch sensor may include first touch electrodes TX1 to TX5 and second touch electrodes RX1 to RX4. The touch sensing unit TS may further include first touch signal lines TL1 to TL5 connected to the first touch electrodes TX1 to TX5, second touch signal lines RL1 to RL4 connected to the second touch electrodes RX1 to RX4, and touch pads TPD connected to the first touch signal lines TL1 to TL5 and the second touch signal lines RL1 to RL4.

Each of the first touch electrodes TX1 to TX5 may have a mesh shape in which a plurality of touch opening parts are defined. Each of the first touch electrodes TX1 to TX5 may include a plurality of first touch sensor units SP1 and a plurality of first connecting units CP1. The first touch sensor units SP1 are deployed (e.g., arranged) along the first direction DR1. Each of the first connecting units CP1 connects two adjacent first touch sensor units SP1 among the first touch sensor units SP1. Although not shown in detail, each of the first touch signal lines TL1 to TL5 may also have a mesh shape.

The second touch electrodes RX1 to RX4 are intersected with the first touch electrodes TX1 to TX5 in an insulated manner. Each of the second touch electrodes RX1 to RX4 may have a mesh shape in which a plurality of touch opening parts are defined. Each of the second touch electrodes RX1 to RX4 includes a plurality of second touch sensor units SP2 and a plurality of second connecting units CP2. The second touch sensor units SP2 are deployed (e.g., arranged) along the second direction DR2. Each of the second connecting units CP2 connects two adjacent second touch sensor units SP2 among the second touch sensor units SP2. The second touch signal lines RL1 to RL4 may also have a mesh shape.

The first touch electrodes TX1 to TX5 and the second touch electrodes RX1 to RX4 are electrostatically coupled. When an external input (e.g., external input TC) is applied, the capacitances of capacitors between the first touch sensor units SP1 and the second touch sensor units SP2 may be changed.

According to some exemplary embodiments, and as exemplarily illustrated, the plurality of first connecting units CP1 may be formed from the first touch electrode layer TML1, and the plurality of first touch sensor units SP1, the plurality of second touch sensor units SP2, and the plurality of second connecting units CP2 may be formed from the second touch electrode layer TML2. However, exemplary embodiments are not limited thereto. For instance, a part of the plurality of first touch sensor units SP1, the plurality of first connecting units CP1, the first touch signal lines TL1 to TL5, the plurality of second touch sensor units SP2, the plurality of second connecting units CP2, and the second touch signal lines RL1 to RL4 may be formed from the first touch electrode layer TML1 shown in FIG. 5, and the other part may be formed from the second touch electrode layer TML2 shown in FIG. 5.

A part of the first touch signal lines TL1 to TL5 and a part of the second touch signal lines RL1 to RL4 may be formed from the first touch electrode layer TML1, and the other part may be formed from the second touch electrode layer TML2.

One (e.g., first) ends of the first touch signal lines TL1 to TL5 may be connected to the first touch electrodes TX1 to TX5. The other (or second) ends of the first touch signal lines TL1 to TL5 may be connected to the touch pads TPD.

One (e.g., first) ends of the second touch signal lines RL1 to RL4 may be connected to the second touch electrodes RX1 to RX4. The other (e.g., second) ends of the second touch signal lines RL1 to RL4 may be connected to the touch pads TPD.

The display apparatus EA may include a touch circuit board TFP and a printed circuit board PCB.

The touch circuit board TFP may connect the display panel DP and the printed circuit board PCB. The touch circuit board TFP may have a touch driving chip TIC mounted thereon.

The first touch signal lines TL1 to TL5 may provide a touch driving signal applied from the touch driving chip TIC through the touch pads TPD to the first touch electrodes TX1 to TX5.

The second touch signal lines RL1 to RL4 may provide sensing signals received from the second touch electrodes RX1 to RX4 through the touch pads TPD to the touch driving chip TIC.

Figure 6:
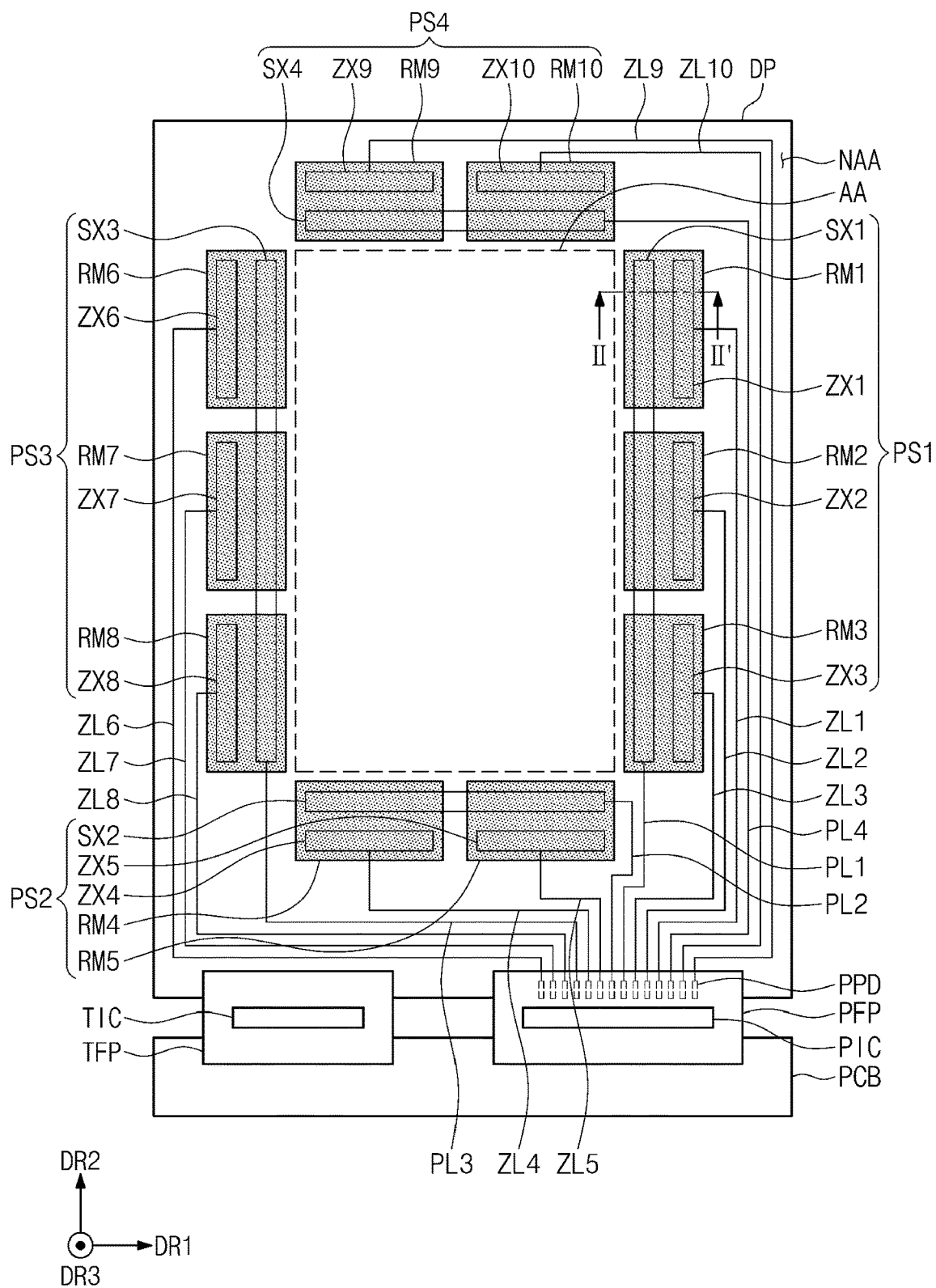
FIG. 6 is a plan view of a touch sensor, a touch circuit board, and a pressure circuit board of a touch sensing unit of the display apparatus in FIG. 2 according to some exemplary embodiments.

FIG. 6 is a plan view of a touch sensor, a touch circuit board, and a pressure circuit board of a touch sensing unit of the display apparatus in FIG. 2 according to some exemplary embodiments.

With reference to FIG. 6, the pressure sensor may be disposed in the pressure area NAA on a plane.

The pressure sensor may include transmission pressure electrode SX1 to SX4, sensing pressure electrodes ZX1 to ZX10, and piezoresistive patterns RM1 to RM10. The touch sensing unit TS may further include transmission pressure signal lines PL1 to PL4 connected to transmission pressure electrodes SX1 to SX4, sensing pressure signal lines ZL1 to ZL10 connected to the sensing pressure electrodes ZX1 to ZX10, and pressure pads PPD connected to the transmission pressure signal lines PL1 to PL4 and the sensing pressure signal lines ZL1 to ZL10.

The pressure sensor may include first to fourth pressure sensors PS1 to PS4.

In some exemplary embodiments, the activation area AA may be defined in a rectangular shape on a plane.

The first pressure sensor PS1 is disposed out (e.g., adjacent to) of one long side of the activation area AA in the first direction DR1, and the second pressure sensor PS2 is disposed out of one short side of the activation area AA. The third pressure sensor PS3 is disposed out of the other long side of the activation area AA in the first direction DR1, and the fourth pressure sensor PS4 is disposed out of the other short side of the activation area AA.

The first to fourth pressure sensors PS1 to PS4 may be covered by the shield layer BM (see FIG. 2). In other words, the first to fourth pressure sensors PS1 to PS4 may be disposed in the non-display area NDA.

In some exemplary embodiments, the pressure sensor may include only a part of the first to fourth pressure sensors PS1 to PS4.

One (e.g., first) ends of the transmission pressure signal lines PL1 to PL4 may be connected to the transmission pressure electrodes SX1 to SX4. The other (e.g., second) ends of the transmission pressure signal lines PL1 to PL4 may be connected to the pressure pads PPD.

One (e.g., first) ends of the sensing pressure signal lines ZL1 to ZL10 may be connected to the sensing pressure electrodes ZX1 to ZX10. The other (e.g., second) ends of the sensing pressure signal lines ZL1 to ZL10 may be connected to the pressure pads PPD.

A part of the transmission pressure electrodes SX1 to SX4, the sensing pressure electrodes ZX1 to ZX10, the transmission pressure signal lines PL1 to PL4, and the sensing pressure signal lines ZL1 to ZL10 is formed from the first touch electrode layer TML1 illustrated in FIG. 5, and the other part is formed from the second touch electrode layer TML2 illustrated in FIG. 5.

Parts of the respective transmission pressure signal lines PL1 to PL4 and parts of the respective sensing pressure signal lines ZL1 to ZL10 may be formed from the first touch electrode layer TML1, and the other parts may be formed from the second touch electrode layer TML2.

The first touch signal lines TL to TL5 and the second touch signal lines RL1 to RL4 may be designed to intersect with, but not to interfere with the transmission pressure signal lines PL1 to PL4 and the sensing pressure signal lines ZL1 to ZL10 on the plane.

The display apparatus EA may further include a pressure circuit board PFP. The pressure circuit board PFP may be separated from the touch circuit board TFP in the first direction DR1. The pressure circuit board PFP may connect the display panel DP and the printed circuit board PCB. A pressure driving chip PIC may be mounted on the pressure circuit board PFP.

The transmission pressure signal lines PL1 to PL4 may deliver a pressure driving signal applied from the pressure driving chip PIC through the pressure pads PPD to the transmission pressure electrodes SX1 to SX4.

The sensing pressure signal lines ZL1 to ZL10 may deliver pressure sensing signals received from the sensing pressure electrodes ZX1 to ZX10 through the pressure pads PPD to the pressure driving chip PIC.

In some exemplary embodiments, it is exemplarily illustrated that the pressure circuit board PFP and the touch circuit board TFP are separately provided, but in some exemplary embodiments, the pressure circuit board PFP and the touch circuit board TFP may be implemented in a single integrated circuit board (not shown), and the pressure driving chip PIC and the touch driving chip TIC may be mounted on the integrated circuit board.

The first pressure sensor PS1 may include a first transmission pressure electrode SX1, first to third sensing pressure electrodes ZX1 to ZX3, and first to third piezoresistive patterns RM1 to RM3. The second pressure sensor PS2 may include a second transmission pressure electrode SX2, fourth and fifth sensing pressure electrodes ZX4 and ZX5, and fourth and fifth piezoresistive patterns RM4 and RM5. The third pressure sensor PS3 may include a third transmission pressure electrode SX3, sixth to eighth sensing pressure electrodes ZX6 to ZX8, and sixth to eighth piezoresistive patterns RM6 to RM8. The fourth pressure sensor PS4 may include a fourth transmission pressure electrode SX4, ninth and tenth sensing pressure electrodes ZX9 and ZX10, and ninth and tenth piezoresistive patterns RM9 and RM10. The first to fourth pressure sensors PS1 to PS4 have the substantially same configuration, and thus, a detailed description about the first pressure sensor PS1 will be provided with reference to FIGS. 6 to 8, and descriptions about the second to fourth pressure sensors PS2 to PS4 will be omitted.

Figure 7:
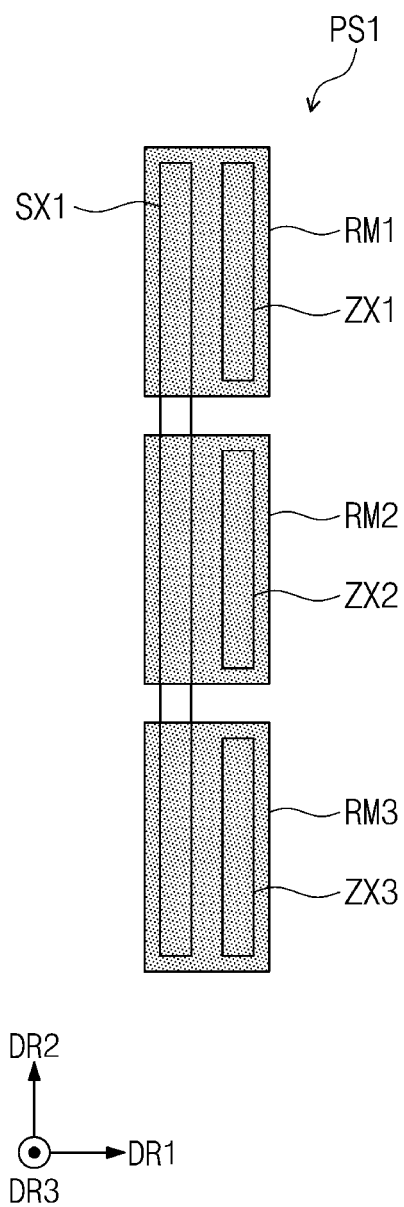
FIG. 7 is an enlarged plan view of a first pressure sensor in FIG. 6 according to some exemplary embodiments.
Figure 8:
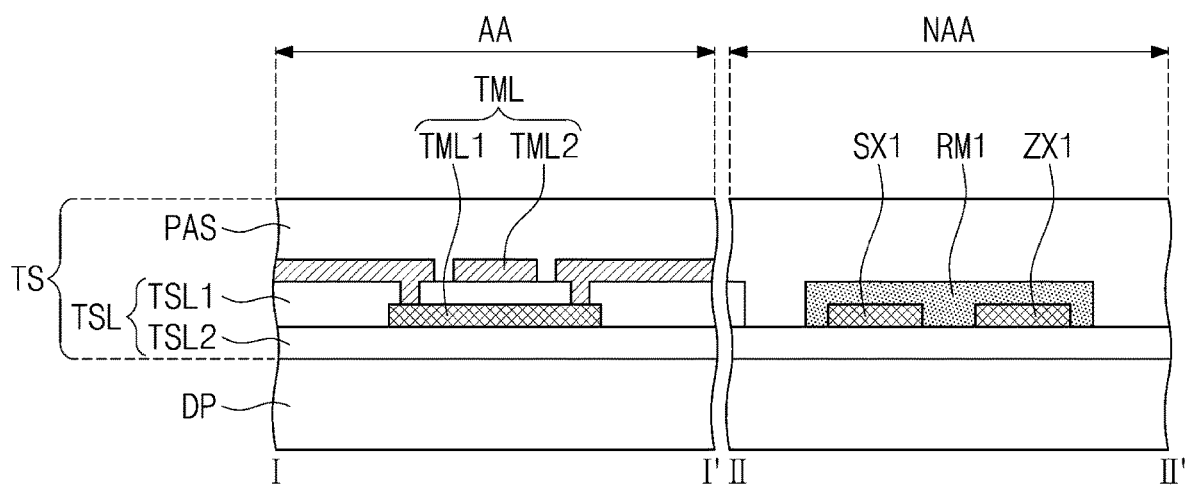
FIG. 8 is a cross-sectional view along sectional line I-I' of FIG. 4 and a cross-sectional view along sectional line II-II' of FIG. 6 according to some exemplary embodiments.

FIG. 7 is an enlarged plan view of a first pressure sensor in FIG. 6 according to some exemplary embodiments. FIG. 8 is a cross-sectional view along sectional line I-I' of FIG. 4 and a cross-sectional view along sectional line II-II' of FIG. 6 according to some exemplary embodiments.

With reference to FIGS. 7 and 8, the first transmission pressure electrode SX1 of the first pressure sensor PS1 may be extended along the long side of the activation area AA. The first to third sensing pressure electrodes ZX1 to ZX3 may be separated from the first transmission pressure electrode SX1 in the first direction DR1. The first to third sensing pressure electrodes ZX1 to ZX3 may be separated from each other in the second direction DR2.

Each of the first to third piezoresistive patterns RM1 to RM3 may contact a corresponding sensing pressure electrode among the first transmission pressure electrode SX1 and the first to third sensing pressure electrodes ZX1 to ZX3.

In some exemplary embodiments, the first to third sensing pressure electrodes ZX1 to ZX3 and the first to third piezoresistive patterns RM to RM3 are exemplarily illustrated, but the number of the sensing pressure electrodes and the piezoresistive patterns may be set in various ways.

For example, the first piezoresistive pattern RM1 may contact the first transmission pressure electrode SX1 and the first sensing pressure electrode ZX1. The first piezoresistive pattern RM1 may overlap the first transmission pressure electrode SX1 and the first sensing pressure electrode ZX1, and overlap a region between the first transmission pressure electrode SX1 and the first sensing pressure electrode ZX1. The second piezoresistive pattern RM2 may contact and overlap the first transmission pressure electrode SX1 and the second sensing pressure electrode ZX2. The third piezoresistive pattern RM3 may contact and overlap the first transmission pressure electrode SX1 and the third sensing pressure electrode ZX3.

The first transmission pressure electrode SX1 and the first to third sensing pressure electrodes ZX1 to ZX3 may be formed in the same operations as those of the first touch electrode layer TML1 or the second touch electrode layer TML2. Accordingly, the first transmission pressure electrode SX1 and the first to third sensing pressure electrodes ZX1 to ZX3 may be disposed on the same layer as the first touch electrode layer TML1 or the second touch electrode layer TML2, and formed from the same material.

As seen in at least FIGS. 7 and 8, the first transmission pressure electrode SX1 and the first to third sensing pressure electrodes ZX1 to ZX3 may be disposed on the same layer as the first touch electrode layer TML1.

The first to third piezoresistive patterns RM1 to RM3 may be disposed above the first transmission pressure electrode SX1 and the first to third sensing pressure electrodes ZX1 to ZX3. The planarization film PAS may be disposed above the first to third piezoresistive patterns RM1 to RM3.

The first touch insulation layer TSL1 may be removed from a region in which the first transmission pressure electrode SX1 and the first to third sensing pressure electrodes ZX1 to ZX3 are disposed. Accordingly, the first touch insulation layer TSL1 may not overlap the first transmission pressure electrode SX1 and the first to third sensing pressure electrodes ZX1 to ZX3, and the first to third piezoresistive patterns RM1 to RM3 may contact the first transmission pressure electrode SX1 and the first to third sensing pressure electrodes ZX1 to ZX3.

The cross-sectional structure of FIG. 8 may be applied to a sensor according to another exemplary embodiment to be described later with reference to FIGS. 9 and 10.

The first to third piezoresistive patterns RM1 to RM3 may include a piezoresistive material in which the resistance is changed by applied pressure. The piezoresistive material may be a conductive polymer in which a conductive material is mixed with a polymer. The piezoresistive material may be a quantum tunneling composite.

Referring to FIG. 6 again, when pressure is applied by an external input (e.g., external input TC) at an overlapping location with the first piezoresistive pattern RM1, the resistance of the first piezoresistive pattern RM1 may be changed. A current flowing between the first transmission pressure electrode SX1 and the first sensing pressure electrode ZX1 is changed by a pressure driving signal applied to the first transmission pressure electrode SX1, and the pressure driving chip PIC may receive such a current change as a pressure sensing signal.

Since the resistance of the first piezoresistive pattern RM1 is determined according to the magnitude of applied pressure, the location and magnitude of the applied pressure may be sensed through a pressure sensor.

In some exemplary embodiments, the first to fourth transmission pressure electrodes SX1 to SX4 of the first to fourth pressure sensors PS1 to PS4 may be separated from each other, and receive the same or different pressure driving signals. However, exemplary embodiments are not limited thereto, and the first to fourth transmission pressure electrodes SX1 to SX4 of the first to fourth pressure sensors PS1 to PS4 may be connected to each other, have an integrated shape, and receive one pressure driving signal.

According to various exemplary embodiments, the display apparatus EA may include an element configured to sense the magnitude and location of a pressure as the external input TC and may be provided in the touch sensing unit TS. In addition, since a pressure sensor is formed in a process in which a touch sensor is formed, a process to form the pressure sensor may be minimized (or at least reduced), and thus, cost and time may be also saved. In addition, according to various exemplary embodiments, the pressure as the external input TC is sensed in a non-display region on which an image is not displayed, and thus, an effect that a physical button is likely to be provided in the non-display region may be achieved.

Figure 9:
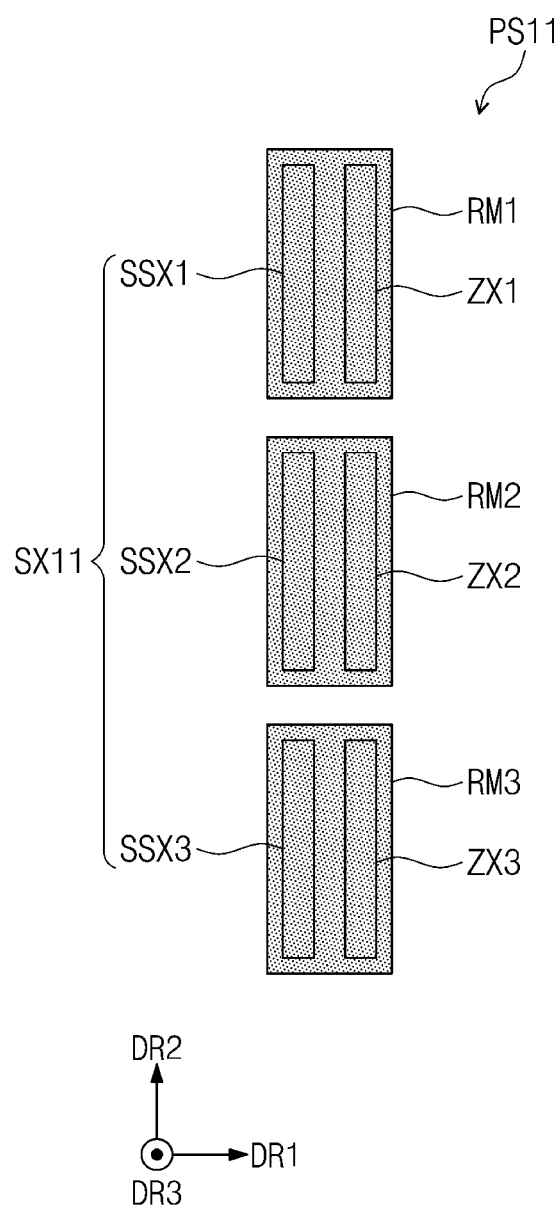
FIG. 9 is an enlarged plan view of another first pressure sensor according to some exemplary embodiments.

FIG. 9 is an enlarged plan view of another first pressure sensor according to some exemplary embodiments.

In comparison with the first pressure sensor PS1 described above in relation to FIG. 7, a first pressure sensor PS11 to be described in relation to FIG. 9 has a difference in the first transmission pressure electrode SX11, and the remaining configuration is substantially similar. Accordingly, a description only about the first transmission pressure electrode SX11 will be provided in more detail.

The first transmission pressure electrode SX11 may include first to third sub-transmission pressure electrodes SSX1 to SSX3. The first to third sub-transmission pressure electrodes SSX1 to SSX3 may be separated from each other in the second direction DR2. Each of the first to third sub-transmission pressure electrodes SSX1 to SSX3 and each of the first to third sensing pressure electrodes ZX1 to ZX3 may contact the first to third piezoresistive patterns RM1 to RM3, respectively.

The first to third sub-transmission pressure electrodes SSX1 to SSX3 may be physically separated, but receive the same signal.

Figure 10:
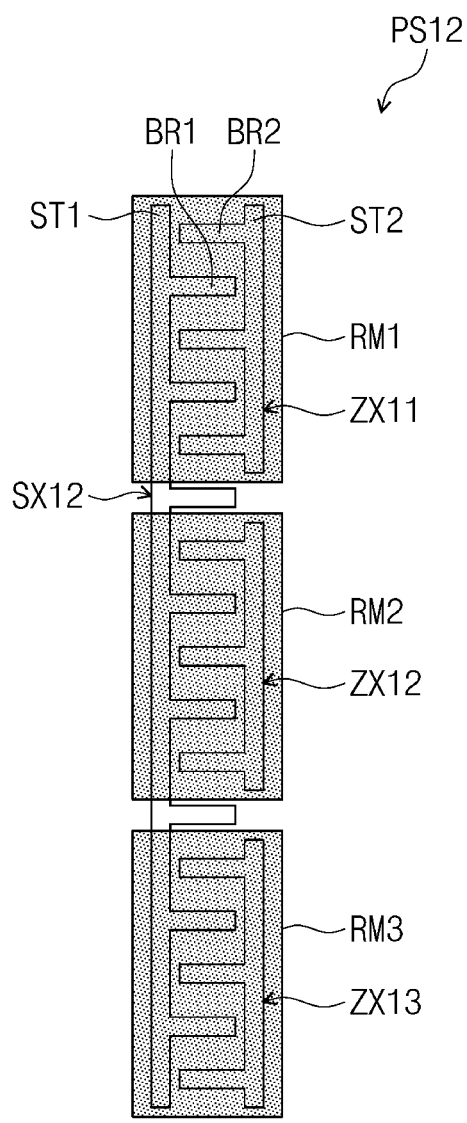
FIG. 10 is an enlarged plan view of yet another first pressure sensor according to some exemplary embodiments.

FIG. 10 is an enlarged plan view of yet another first pressure sensor according to some exemplary embodiments.

In comparison with the first pressure sensor PS1 described above in relation to FIG. 7, a first pressure sensor PS12 to be described in relation to FIG. 10 has differences in a first transmission pressure electrode SX12 and first to third sensing pressure electrodes ZX11 to ZX13, and the remaining configuration is substantially similar. Therefore, descriptions only about the first transmission pressure electrode SX12 and the first to third sensing pressure electrodes ZX11 to ZX13 will be provided in detail.

Each of the first transmission pressure electrode SX12 and the first to third sensing pressure electrodes ZX11 to ZX13 may have a comb shape.

The first transmission pressure electrode SX12 may have a first stem part ST1 and first branch parts BR1. The first stem part ST1 may be extended in the second direction DR2. The first branch parts BR1 may be extended from the first stem part ST1 in the first direction DR1. The first branches BR1 may be separated from each other in the second direction DR2.

Each of the first to third sensing pressure electrodes ZX11 to ZX13 may include a second stem part ST2 and second branch parts BR2. The second stem part ST2 may be extended in the second direction DR2. The second branch parts BR2 may be extended from the second stem part ST2 in the first direction DR1.

The first and second branch parts BR1 and BR2 may be disposed between the first and second stem parts ST1 and ST2. The first branch parts BR1 and the second branch parts BR2 may be alternately disposed in the second direction DR2. In other words, each of the first branch parts BR1 may be disposed between the second branch parts BR2.

Due to the shapes of the first transmission pressure electrode SX12 and the first to third sensing pressure electrodes ZX11 to ZX13, the first pressure sensor PS12 of FIG. 10 may have an effect that the electrodes become longer (or larger), and the sensitivity may be improved in sensing response to the applied pressure.

Figure 11:
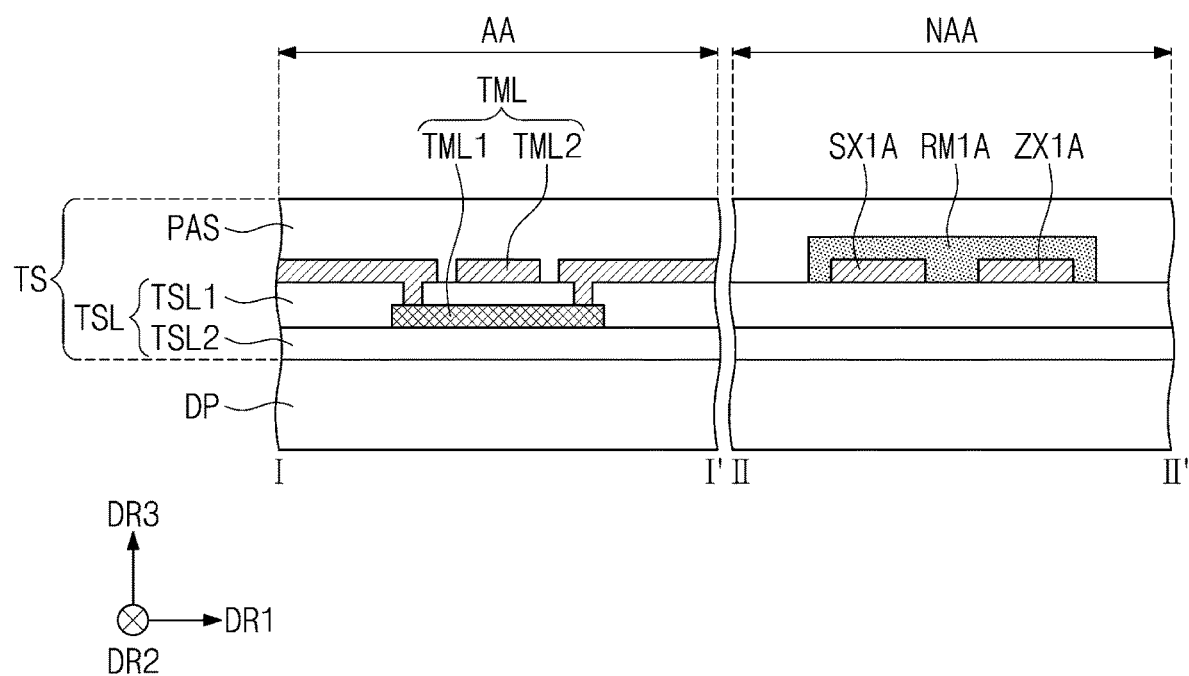
FIG. 11 is a cross-sectional view along sectional line I-I' of FIG. 4 and a cross-sectional view along sectional line II-II' of FIG. 6 according to some exemplary embodiments.

FIG. 11 is a cross-sectional view along sectional line I-I' of FIG. 4 and a cross-sectional view along sectional line II-II' of FIG. 6 according to some exemplary embodiments.

The cross-sectional structure of FIG. 11 may be applied to a display apparatus having any of the first pressure sensors PS1, PS11, and PS12 illustrated in FIGS. 7, 9 and 10.

Hereinafter, the cross-sectional structure of the first pressure sensor PS1 illustrated in FIG. 7 will be described as an example.

A first transmission pressure electrode SX1A and a first sensing pressure electrode ZX1A may be disposed on the same layer as the second touch electrode layer TML2.

A first piezoresistive pattern RM1A may be disposed above the first transmission pressure electrode SX1A and the first sensing pressure electrode ZX1A, and may contact the first transmission pressure electrode SX1A and the first sensing pressure electrode ZX1A.

Figure 12:
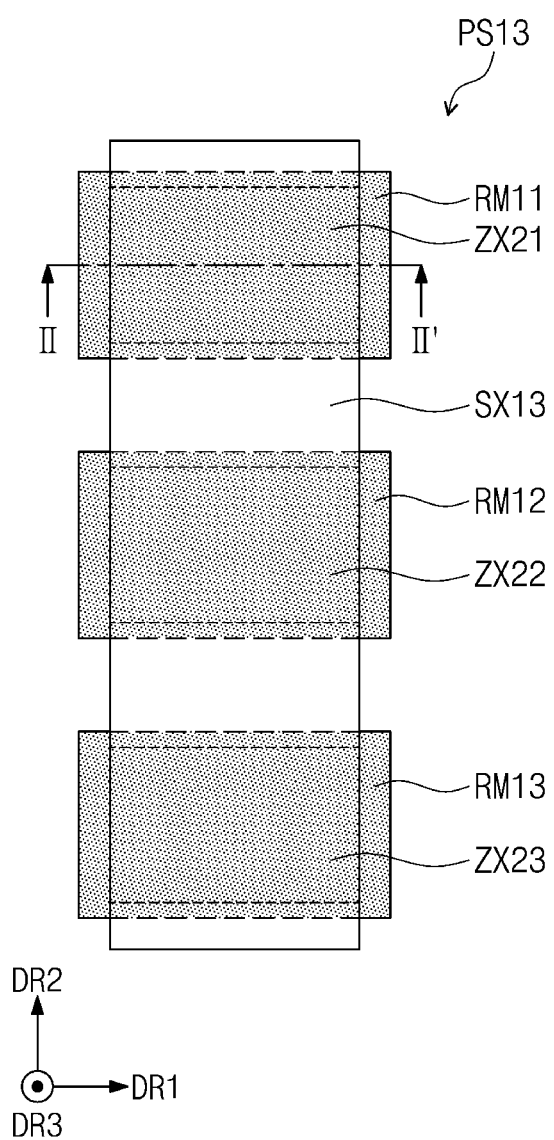
FIG. 12 is a plan view of yet another first pressure sensor according to some exemplary embodiments.
Figure 13:
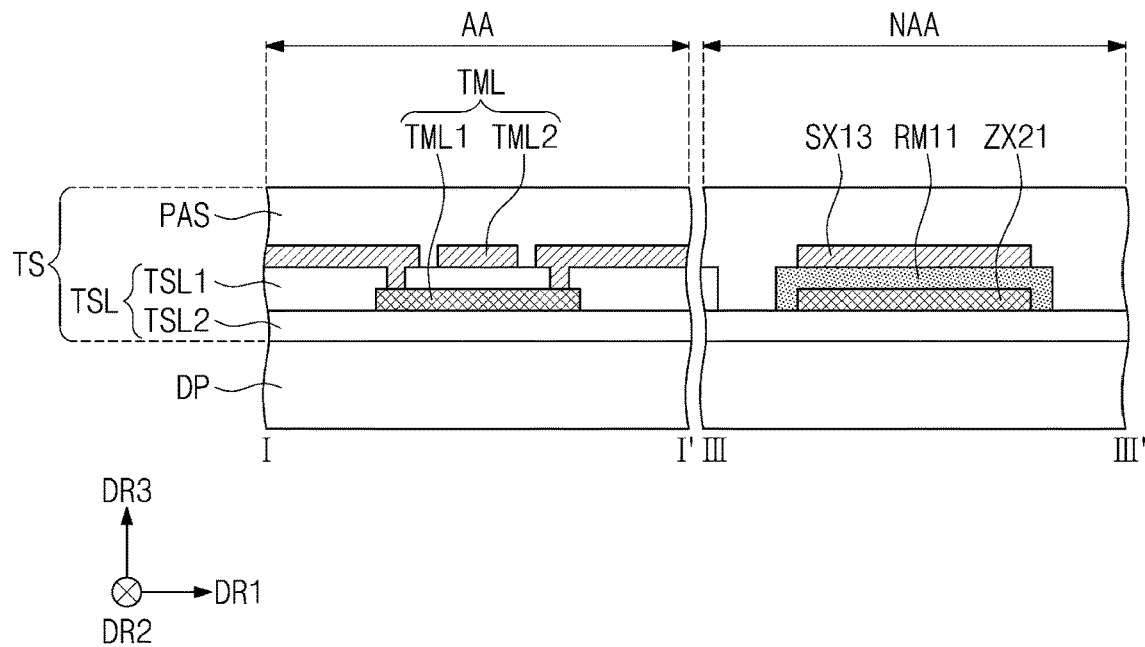
FIG. 13 is a cross-sectional view along sectional line I-I' of FIG. 4 and a cross-sectional view along sectional line III-III' of FIG. 12 according to some exemplary embodiments.

FIG. 12 is a plan view of yet another first pressure sensor according to some exemplary embodiments. FIG. 13 is a cross-sectional view along sectional line I-I' of FIG. 4 and a cross-sectional view along sectional line III-III' of FIG. 12 according to some exemplary embodiments.

A first pressure sensor PS13 in relation to FIG. 12 will be described on the basis of a difference from the first pressure sensor PS1 described above in relation to FIG. 7.

The first pressure sensor PS13 may include a first transmission pressure electrode SX13, first to third sensing pressure electrodes ZX21, ZX22 and ZX23, and first to third piezoresistive patterns RM11, RM12, and RM13.

The first transmission pressure electrode SX13 may overlap the first to third sensing pressure electrodes ZX21, ZX22, and ZX23 on a plane. In some exemplary embodiments, the first transmission pressure electrode SX13 is illustrated to cover the first to third sensing pressure electrodes ZX21, ZX22 and ZX23 on a plane, but exemplary embodiments are not limited thereto. The first to third sensing pressure electrodes ZX21, ZX22 and ZX23 may be separated from each other in the second direction DR2.

Each of the first to third piezoresistive patterns RM11, RM12, and RM13 may be disposed between the first transmission pressure electrode SX13 and the first to third sensing pressure electrodes ZX21, ZX22, and ZX23.

The first transmission pressure electrode SX13 may be formed in the same operation(s) as any one of the first touch electrode layer TML1 and the second touch electrode layer TML2. In addition, the first to third sensing pressure electrodes ZX21, ZX22 and ZX23 may be formed in the same operation(s) as the other of the first touch electrode layer TML1 and the second touch electrode layer TML2.

FIG. 13 exemplarily illustrates that the first transmission pressure electrode SX13 is disposed on the same layer as the second touch electrode layer TML2, and the first to third sensing pressure electrodes ZX21, ZX22 and ZX23 are disposed on the same layer as the first touch electrode layer TML1.

A first touch insulation layer TSL1 may be removed from a region in which the first transmission pressure electrode SX13 and the first to third sensing pressure electrodes ZX21, ZX22 and ZX23 are disposed. Accordingly, the first touch insulation layer TSL1 does not overlap the first transmission pressure electrode SX13 and the first to third sensing pressure electrodes ZX21, ZX22 and ZX23, and the first to third piezoresistive patterns RM11, RM12 and RM13 may contact the first transmission pressure electrode SX13 and the first to third sensing pressure electrodes ZX21, ZX22 and ZX23.

Figure 14:
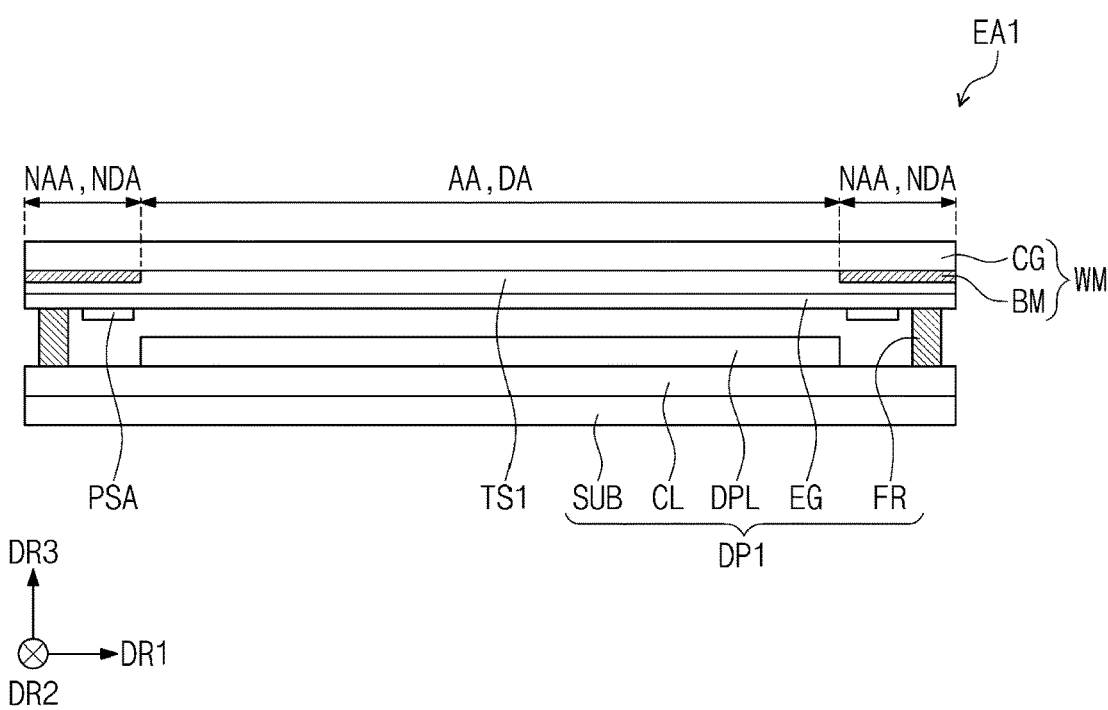
FIG. 14 is a cross-sectional view of another display apparatus according to some exemplary embodiments.

FIG. 14 is a cross-sectional view of another display apparatus according to some exemplary embodiments.

The display apparatus EA1 in relation to FIG. 14 will be described on the basis of a difference from the display apparatus EA described above in relation to FIG. 2.

The touch sensing unit TS1 acquires coordinate information on a touch as an external input. In some exemplary embodiments, the touch sensing unit TS1 may not sense coordinate information on and the magnitude of pressure as an external input.

The display apparatus EA1 may include a display panel DP1, the touch sensing unit TS1, and a window member WM.

A base layer SUB, a circuit element layer CL, and a display element layer DPL of the display panel DP1 may be substantially identical to those of the display apparatus EA of FIG. 2, and thus, detailed descriptions of these components will be omitted.

An encapsulation layer of the display panel DP1 may include an encapsulation substrate EG and a sealing member FR. The encapsulation substrate EG and the sealing member FR may together play a similar function to the encapsulation layer TFE of FIG. 2.

The encapsulation substrate EG may be provided in a plate shape on the display element layer DPL. The sealing member FR may seal between the encapsulation substrate EG and the circuit element layer CL. The sealing member FR may be disposed in the non-display area NDA and overlap a shield layer BM.

The display panel DPI may further include a pressure sensor PSA.

The pressure sensor PSA may be disposed on one surface of the encapsulation substrate EG and disposed between the encapsulation substrate EG and the circuit element layer CL. The pressure sensor PSA may be disposed in the non-display area NDA and overlap the shield layer BM.

The shape of the pressure sensor PSA may be the same as any one of the shapes of the first pressure sensors described in relation to FIGS. 7, 9, 10 and 12.

According to the display apparatus EA1, an element configured to sense the magnitude and location of the pressure as the external input may be provided in the display panel DP1. In addition, the pressure sensor PSA may be formed on one surface of the encapsulation substrate EG of the display panel DP1, and thus, the relative distance to the top surface of the window member WM, to which the external input TC may be applied, may be smaller in comparison to a case where a pressure sensor is disposed below the circuit element layer CL. In this manner, the display apparatus EA1 may have improved pressure sensing sensitivity.

Figure 15:
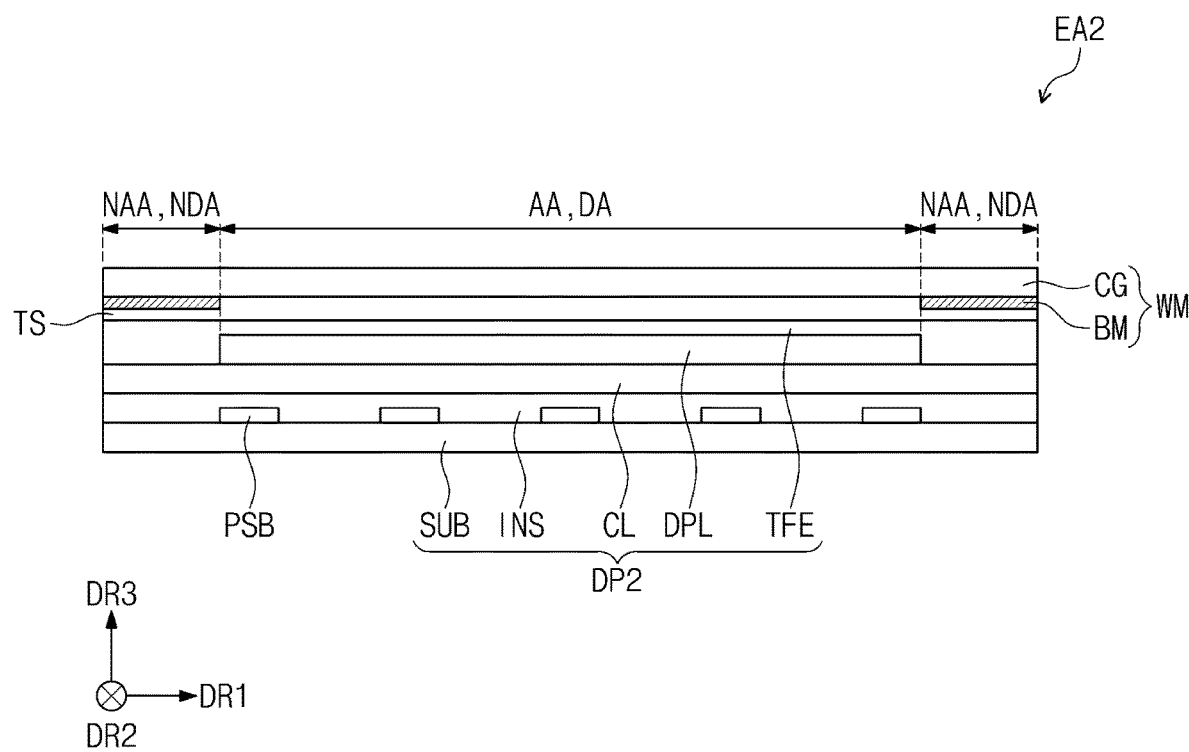
FIG. 15 is a cross-sectional view of yet another display apparatus according to some exemplary embodiments.

FIG. 15 is a cross-sectional view of yet another display apparatus according to some exemplary embodiments.

A display apparatus EA2 in relation to FIG. 15 will be described on the basis of a difference from the display apparatus EA described above in relation to FIG. 2.

The touch sensing unit TS acquires coordinate information on a touch as an external input. In some exemplary embodiments, the touch sensing unit TS may not sense the coordinate information on and the magnitude of pressure as the external input.

The display panel DP2 may further include the pressure sensor PSB.

The pressure sensor PSB may be disposed between the base layer SUB and the circuit element layer CL. The pressure sensor PSB may be disposed to overlap all of the non-display area NDA and the display area DA. In other words, the pressure sensor PSB may overlap the shield layer BM and light emitting diodes of the display element layer DPL.

The shape of the pressure sensor PSB may be the same as any one of shapes of the first pressure sensors described in relation to FIGS. 7, 9, 10 and 12.

The display panel DP2 may be disposed above the pressure sensor PSB, and further include an insulation layer INS disposed between the base layer SUB and the circuit element layer CL.

According to the display apparatus EA2, an element configured to sense the magnitude and location of the pressure as the external input TC may be provided in the display panel DP2. In addition, a pressure senor PSB may be formed below the display element layer DPL, and thus, does not affect light to be emitted externally. Therefore, the pressure sensor PSB may be disposed in the display area DA as well as the non-display area NDA. Accordingly, the display apparatus EA2 may sense the magnitude and coordinates of the pressure in the display area DA and the non-display area NDA.

Figure 16:
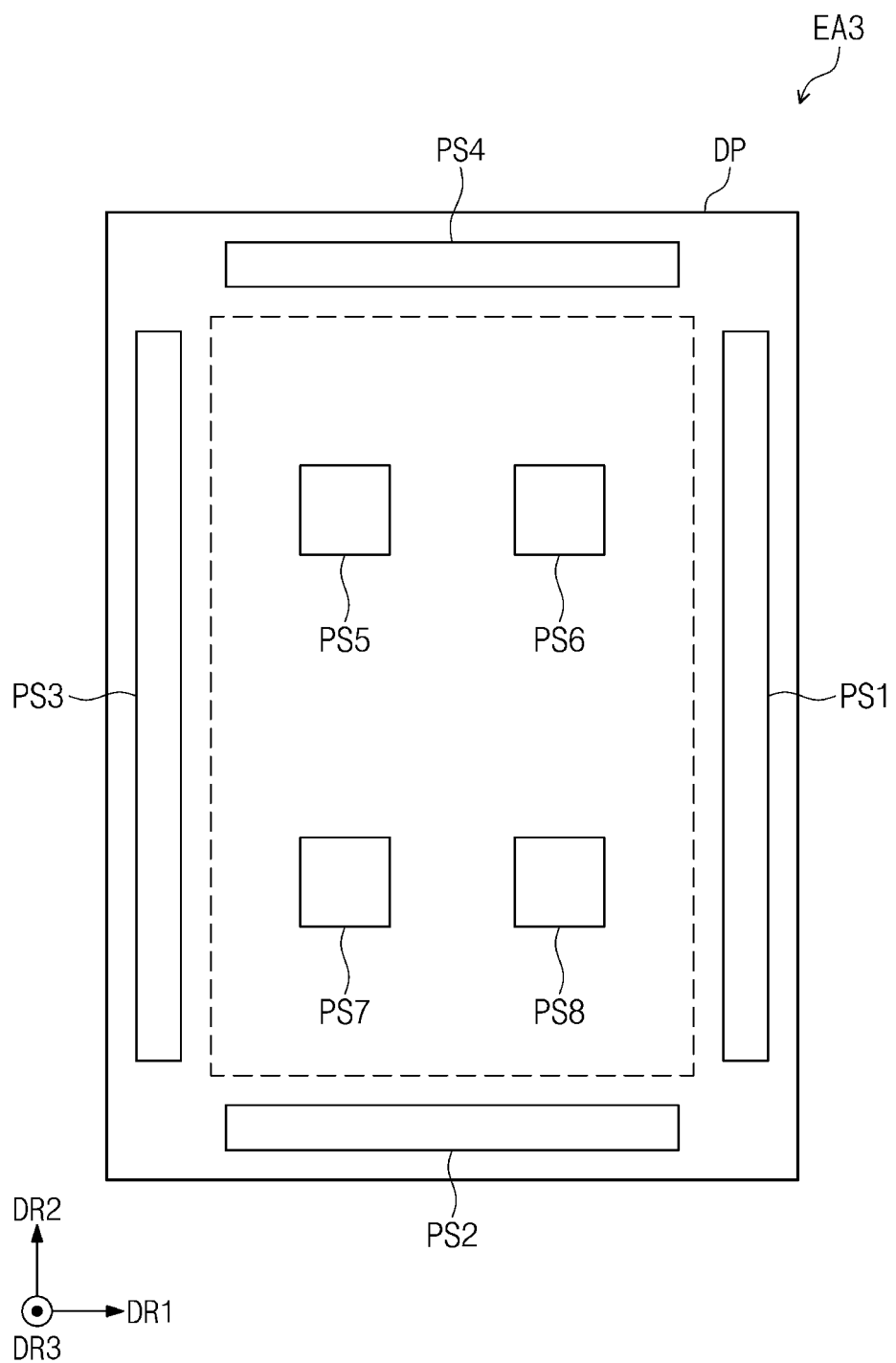
FIG. 16 is a plan view illustrating a pressure sensor of a touch sensing unit according to some exemplary embodiments.

FIG. 16 is a plan view illustrating a pressure sensor of a touch sensing unit according to some exemplary embodiments.

A display apparatus EA3 to be described in relation to FIG. 16 is characterized in that fifth to eighth pressure sensors PS5 to PS8 are further included in comparison to the display apparatus EA described above in relation to FIG. 6. Detailed configurations of the first to fourth pressure sensors PS1 to PS4 in FIG. 16 will be omitted, and reference numerals thereof are identically indicated to those in FIG. 6.

The display apparatus EA3 may further include the fifth to eighth pressure sensors PS5 to PS8. The fifth to eighth pressure sensors PS5 to PS8 may be disposed in the activation area AA. The fifth to eighth pressure sensors PS5 to PS8 may be separately disposed from the first touch electrodes TX1 to TX5 and the second touch electrodes RX1 to RX4. The fifth to eighth pressure sensors PS5 to PS8 may be separated from each other.

A transmission pressure electrode and a sensing pressure electrode included in each of the fifth to eighth pressure sensors PS5 to PS8 may include a transparent and conductive material or have a mesh shape through which light may penetrate. A piezoresistive pattern included in each of the fifth to eighth pressure sensors PS5 to PS8 may include a transparent material of which resistance is changed by applied pressure.

In some exemplary embodiments, the fifth to eighth pressure sensors PS5 to PS8 are exemplarily illustrated, but the number of pressure sensors disposed in the activation area AA is not limited thereto. In addition, the number of sensing pressure electrodes included in each of the fifth to eight pressure sensors PS5 to PS8 is not limited.

The display apparatus EA3 described in relation to FIG. 16 may have the same effect as that of the display apparatus EA described above in relation to FIGS. 1 to 8. In addition, the piezoresistive material forming the pressure sensor may be formed with a transparent material, the pressure sensor may be disposed in the activation area AA, and consequently, the pressure caused by the external input TC may be sensed even in the activation area AA.

According to various exemplary embodiments, pressure as an external input may be sensed on a non-display area, in which an image is not displayed, to achieve an effect that a physical button is likely to be provided in the non-display area. In addition, a pressure sensor may be formed using a process for forming a touch sensor to minimize a process necessary for forming the pressure sensor, and thus, cost and time may be saved.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display apparatus comprising:
a display panel; and
a touch sensing unit disposed on the display panel,
wherein the touch sensing unit comprises:
  a touch sensor comprising:
    a first touch electrode layer, and
    a second touch electrode layer disposed on the first touch electrode layer; and
  a first pressure sensor comprising:
    a transmission pressure electrode,
    a sensing pressure electrode separated from the transmission pressure electrode, and
    a piezoresistive pattern contacting each of the transmission pressure electrode and the sensing pressure electrode, and
wherein each of the transmission pressure electrode and the sensing pressure electrode is disposed in a same layer as any one of the first touch electrode layer and the second touch electrode layer.

2. The display apparatus of claim 1, wherein:
an activation region and a pressure region adjacent to the activation region are defined in the touch sensing unit;
the touch sensor is disposed in the activation region on a plane; and
the first pressure sensor is disposed in the pressure region on the plane.

3. The display apparatus of claim 2, further comprising:
a window member disposed on the touch sensing unit such that the touch sensing unit is disposed between the window member and the display panel,
wherein the window member comprises:
  a cover window, and
  a shield layer disposed on one side of the cover window, and
wherein the first pressure sensor overlaps the shield layer.

4. The display apparatus of claim 2, wherein:
the activation region is defined as a rectangular shape on the plane;
the first pressure sensor is disposed outside of the activation region and adjacent to one side of the activation region; and
the display apparatus further comprises a second pressure sensor disposed outside of the activation region and adjacent to another side of the activation region, the second pressure sensor being disposed in a same layer as the first pressure sensor.

5. The display apparatus of claim 1, wherein the touch sensing unit further comprises:
a transmission pressure signal line connected to the transmission pressure electrode;
a sensing pressure signal line connected to the sensing pressure electrode;
a first pressure pad connected to the transmission pressure signal line; and
a second pressure pad connected to the sensing pressure signal line.

6. The display apparatus of claim 5, further comprising:
a printed circuit board configured to:
  provide a first signal to the touch sensing unit; and
  receive a second signal from the touch sensing unit;
a touch circuit board connected between the touch sensing unit and the printed circuit board, the touch circuit board being configured to:
  provide a third signal to the touch sensor; and
  receive a fourth signal from the touch sensor; and
a pressure circuit board connected between the touch sensing unit and the printed circuit board, spaced apart from the touch circuit board, and connected to each of the first pressure pad and the second pressure pad.

7. The display apparatus of claim 1, wherein the piezoresistive pattern comprises a conductive polymer.

8. The display apparatus of claim 1, wherein:
the touch sensing unit further comprises a first touch insulation layer disposed between the first touch electrode layer and the second touch electrode layer,
the first touch insulation layer overlaps neither the transmission pressure electrode nor the sensing pressure electrode.

9. The display apparatus of claim 1, wherein:
the sensing pressure electrode comprises first and second sensing pressure electrodes separated from each other;
the piezoresistive pattern comprises first and second piezoresistive patterns spaced apart from each other;
the first piezoresistive pattern contacts each of the transmission pressure electrode and the first sensing pressure electrode; and
the second piezoresistive pattern contacts each of the transmission pressure electrode and the second sensing pressure electrode.

10. The display apparatus of claim 1, wherein:
each of the transmission pressure electrode and the sensing pressure electrode are disposed in a same layer as the first touch electrode layer; and
the piezoresistive pattern is disposed on each of the transmission pressure electrode and the sensing pressure electrode such that each of the transmission pressure electrode and the sensing pressure electrode is disposed between the piezoresistive pattern and the display panel.

11. The display apparatus of claim 1, wherein:
the transmission pressure electrode comprises:
  a first stem part, and
  first branch parts extending from the first stem part in a direction intersecting with an extension direction of the first stem part;

the sensing pressure electrode comprises:
a second stem part, and
second branch parts extending from the second stem part in a direction intersecting with an extension direction of the second stem part; and
the first branch parts and the second branch parts are alternately arranged.

12. The display apparatus of claim 1, wherein:
each of the transmission pressure electrode and the sensing pressure electrode are disposed in a same layer as the second touch electrode layer; and
the piezoresistive pattern is disposed on each of the transmission pressure electrode and the sensing pressure electrode such that each of the transmission pressure electrode and the sensing pressure electrode is disposed between the piezoresistive pattern and the display panel.

13. The display apparatus of claim 1, wherein:
the transmission pressure electrode overlaps the sensing pressure electrode on a plane; and
the piezoresistive pattern is disposed between the transmission pressure electrode and the sensing pressure electrode.

14. The display apparatus of claim 13, wherein:
the transmission pressure electrode is disposed in a same layer as any one of the first touch electrode layer and the second touch electrode layer, and
the sensing pressure electrode is disposed on a same layer as another layer of the first touch electrode layer and the second touch electrode layer.

15. A display apparatus comprising:
a display panel comprising:
a base layer,
a circuit element layer disposed on the base layer,
a display element layer disposed on the circuit element layer,
an encapsulation layer encapsulating the display element layer, and
a pressure sensor;
a touch sensing unit disposed on the display panel; and
a window member disposed on the touch sensing unit,
wherein the pressure sensor comprises:
a transmission pressure electrode,
a sensing pressure electrode spaced apart from the transmission pressure electrode, and
a piezoresistive pattern contacting each of the transmission pressure electrode and the sensing pressure electrode, and
wherein the pressure sensor is disposed between the base layer and the window member.

16. The display apparatus of claim 15, wherein:
the encapsulation layer comprises:
an encapsulation substrate, and
a sealing member configured to seal between the encapsulation substrate and the circuit element layer; and
the pressure sensor is disposed on one surface of the encapsulation substrate.

17. The display apparatus of claim 16, wherein:
the window member comprises:
a cover window, and
a shield layer disposed on one surface of the cover window; and
the pressure sensor overlaps the shield layer.

18. The display apparatus of claim 15, wherein the pressure sensor is disposed between the base layer and the circuit element layer.

19. The display apparatus of claim 18, wherein:
the display panel comprises:
a display area configured to display an image, and
a non-display area adjacent to the display area; and
the pressure sensor overlaps each of the display area and the non-display area.

20. A display apparatus comprising:
a display panel comprising:
a display area configured to display an image, and
a non-display area outside the display area;
a touch sensing unit disposed on the display panel,
wherein the touch sensing unit comprises:
a touch sensor overlapping the display area on a plane, and
a pressure sensor overlapping the non-display area on the plane,
wherein the touch sensor comprises:
a first touch electrode layer, and
a second touch electrode layer disposed on the first touch electrode layer, and
wherein the pressure sensor comprises:
a transmission pressure electrode,
a sensing pressure electrode spaced apart from the transmission pressure electrode, and
a piezoresistive pattern contacting each of the transmission pressure electrode and the sensing pressure electrode.

* * * * *